United States Patent Office 3,018,176
Patented Jan. 23, 1962

3,018,176
ELUTION OF PRECIOUS METAL SALTS AND
ELUANTS THEREFOR
Herbert Zima, Darmstadt, Germany, assignor to Röhm
& Haas G.m.b.H., Darmstadt, Germany
No Drawing. Filed Feb. 26, 1958, Ser. No. 717,545
Claims priority, application Germany Feb. 27, 1957
14 Claims. (Cl. 75—118)

This invention relates to the extraction of precious metal salts, particularly the salts of gold, palladium and rhodium, from solid polymeric hydrocyanic acid, to eluants therefor, and to a method for recovering precious metal salts from dilute aqueous solutions thereof.

It has recently been discovered that solid polymeric hydrocyanic acid, such as the dark-colored, brown to black and apparently amorphous products obtained by polymerization of hydrogen cyanide in the presence of water and alkaline substances, e.g., polymeric HCN of the type described in German Patent 662,338 and U.S. Patent 2,069,543, is effective in binding the salts of precious metals and extracting them from dilute aqueous solutions thereof when relatively small amounts of the solid polymer are brought into intimate contact with the aqueous solution containing such salts. Such intimate contact may be achieved in any suitable manner such as running the solution through a mass of the polymer or stirring the solid polymer in the solution.

This invention is addressed primarily to the problem of extracting precious metal salts, especially those of gold, palladium and rhodium, from solid polymeric hydrocyanic acid containing such salts.

In accordance with the invention, the desired salts can readily be extracted by bringing the salt-containing polymeric hydrocyanic acid into intimate contact with a liquid eluant comprising a minor portion, e.g., 50% or less, of an aqueous hydrogen chloride solution and a major portion, e.g., 50% or more, of an organic component that is miscible with the aqueous hydrogen chloride solution.

The organic component of the liquid eluant must be miscible with the aqueous hydrogen chloride solution in proportions of at least 1:1. Miscibility in all proportions is preferred. Alcohols, ketones, carboxylic acids and esters are among the classes of organic components that are generally operable as the organic component in the eluants of the invention. Methanol, ethanol, dimethylketone, diethylketone, acetic acid and ethylacetate are examples of typical organic components. Acetone is particularly useful when used in proportions ranging from 50 to 90%, the remainder of the eluant being aqueous hydrogen chloride.

In carrying out an elution in accordance with the method of the invention, it is necessary simply to provide intimate contact between the eluant and the salt-containing polymeric hydrocyanic acid. The elution takes place readily at room temperature. It is possible to accelerate the elution by operating at elevated temperatures, e.g., about 50° C., but it is generally preferable to conduct the elution at room temperature to avoid the possibility of a partial saponification of the polymeric hydrocyanic acid at higher temperatures.

It is surprising that the eluants of the invention exhibit remarkable selectivity with regard to the identity of the salt extracted from solid polymeric hydrocyanic acid. Thus, for example, the elution of polymeric hydrocyanic acid containing a gold salt and a platinum salt will result in an eluate containing well over 90% of the gold salt, yet only a fraction of a percent of the platinum salt initially bound by the polymeric HCN. This surprising result and its practical value in separating gold salts from platinum salts as well as the influence of changes in the relative proportions of organic and aqueous components in the eluant will become further apparent from the following examples included to illustrate the best modes now contemplated of carrying out the invention.

*Example 1*

A 25-gram sample of polymeric hydrocyanic acid containing 4.050 grams gold in the form of chloroauric acid and 5.100 grams of platinum in the form of chloroplatinic acid was placed in a glass column having an inside diameter of 30 mm. The height of the layer was 5 cm. Five liters of eluant composed of a mixture of 67% acetone, 22.5% water and 10.5% hydrogen chloride were allowed to filter through the sample at room temperature over a period of twenty-four hours. The sample was then washed with water and the wash water was added to the eluate.

It was found that the eluate, including wash water, contained 3.878 grams of gold and 0.040 grams platinum. After washing of the solid material with concentrated sulfuric acid, it was determined that the polymeric hydrocyanic acid had retained 0.1625 gram gold in the form of gold salt and 5.050 grams platinum in the form of platinum salt. 95.5% of the gold and only 0.78% of the platinum contents initially contained in the polymeric hydrocyanic acid were extracted, indicating the high selectivity of the eluant employed.

*Example 2*

5.35 grams of polymeric hydrocyanic acid containing 13.2% by weight palladium in the form of chloropalladic acid were stirred for sixteen hours at 50° C. with two liters of eluant composed of a mixture of 66.6% methanol, 10.7% HCl and 22.7% water. The amount of residual palladium in the polymeric hydrocyanic acid was determined quantitatively after separation of the eluate. It was found that 36% of the palladium initially contained in the polymeric hydrocyanic acid had been extracted by the eluant.

*Example 3*

Polymeric hydrocyanic acid was suspended and stirred for several days at 50° C. in a hydrochloric acid solution of rhodium chloride. The polymeric hydrocyanic acid thus loaded with the rhodium salt was washed with water and dried. It was found to contain 11.9% by weight rhodium in the form of rhodium chloride.

A five-gram sample of the dried polymeric hydrocyanic acid thus obtained was treated with the eluant and in the manner described in Example 2. It was found that 51% of the rhodium initially bound to the polymeric HCN was extracted.

*Example 4*

One cubic meter of water containing 240 mg. of gold in the form of chlorauric acid was brought into intimate contact with 10 grams of polymeric hydrocyanic acid. 99% of the gold content was retained in the polymer, which was thereupon divided into four aliquot portions. Each of these portions was then treated with an eluant containing a different proportion of acetone and aqueous hydrochloric acid. The compositions of the eluants and the percentages of gold extracted thereby under otherwise identical conditions are shown in the table immediately below:

| Eluant | | | Gold Extracted, Percent |
|---|---|---|---|
| Acetone, Percent | HCl, Percent | H₂O, Percent | |
| 90.0 | 3.2 | 6.8 | 68.0 |
| 75.0 | 8.0 | 17.0 | 75.5 |
| 66.6 | 10.7 | 22.7 | 94.5 |
| 50.0 | 16.0 | 34.0 | 64.0 |

These data show the remarkable efficiency of the eluants in eluting the gold salt from polymeric HCN as the relative proportion of hydrophilic organic component in the eluant varies from 50 to 90% and demonstrates the surprising fact that optimum elution takes place when the organic component constitutes about two-thirds of the eluant.

It is to be expected that numerous modifications will readily become apparent to those skilled in the art upon reading this description. All such modifications are intended to be included within the scope of the invention as defined in the appended claims.

I claim:

1. Process for extracting a salt of a noble metal from a solid, amorphous, brown-to-black polymer prepared by polymerizing hydrocyanic acid in the presence of an alkali, said polymer containing said salt, which comprises elution thereof with a liquid eluant comprising a minor portion of an aqueous hydrogen chloride solution and a major portion of an organic component miscible with said aqueous hydrogen chloride solution.

2. Process defined in claim 1 wherein the noble metal is gold.

3. Process defined in claim 1 wherein the noble metal is palladium.

4. Process defined in claim 1 wherein the noble metal is rhodium.

5. Process defined in claim 1 wherein the organic component is acetone.

6. Process defined in claim 1 wherein the eluant is composed essentially of about 60 to 80% acetone, 25 to 15% water and 15 to 5% hydrogen chloride.

7. Process defined in claim 1 wherein the eluant is composed essentially of about 60 to 80% methanol, 25 to 15% water and 15 to 5% hydrogen chloride.

8. Process for selectively extracting a gold salt from a solid, amorphous, brown-to-black polymer prepared by polymerizing hydrocyanic acid in the presence of an alkali, said polymer containing said salt and a platinum salt, which comprises elution thereof with a liquid eluant comprising a minor portion of an aqueous hydrogen chloride solution and a major portion of an organic component miscible with said aqueous hydrogen chloride solution.

9. Process for recovering gold from a dilute aqueous solution thereof in the form of chlorauric acid which comprises bringing the solution into intimate contact with a solid, amorphous, brown-to-black polymer prepared by polymerizing hydrocyanic acid in the presence of an alkali, separating the polymer from the aqueous solution, and extracting the polymeric hydrocyanic acid with a liquid eluant composed of a major portion of acetone and a minor portion of an aqueous hydrogen chloride solution.

10. Process defined in claim 9 wherein the acetone is present in the eluant in a proportion of about 60 to 80%.

11. Process for extracting a palladium salt from a solid, amorphous, brown-to-black polymer prepared by polymerizing hydrocyanic acid in the presence of an alkali, said polymer containing said salt, which comprises elution thereof with a liquid eluant comprising a major portion of methanol and a minor portion of an aqueous hydrogen chloride solution.

12. Process for extracting a rhodium salt from a solid, amorphous, brown-to-black polymer prepared by polymerizing hydrocyanic acid in the presence of an alkali, said polymer containing said salt, which comprises elution thereof with a liquid eluant comprising a major portion of methanol and a minor portion of an aqueous hydrogen chloride solution.

13. An eluant for extracting a salt of a noble metal from a solid, amorphous, brown-to-black polymer prepared by polymerizing hydrocyanic acid in the presence of an alkali, said eluant comprising between about 60 to 80% acetone, 25 to 15% water and 15 to 5% hydrogen chloride.

14. An eluant for extracting a salt of a noble metal from a solid, amorphous, brown-to-black polymer prepared by polymerizing hydrocyanic acid in the presence of an alkali, said eluant comprising between about 60 to 80% methanol, 25 to 15% water and 15 to 5% hydrogen chloride.

References Cited in the file of this patent

UNITED STATES PATENTS

| 2,069,543 | Adams et al. | Feb. 2, 1937 |
| 2,726,141 | Appell | Dec. 6, 1955 |
| 2,729,557 | Booth et al. | Jan. 3, 1956 |
| 2,753,258 | Burstall et al. | July 3, 1956 |

OTHER REFERENCES

Thorpe: Dictionary of Applied Chemistry, pages 501, 502, vol. 3, 4th ed. (1939), Longmans, Green and Co., N.Y.

Burstall et al.: Industrial and Eng. Chem., pp. 1648–51, vol. 45, No. 8 (August 1953).

Migrdichian: "Chemistry of Organic Cyanogen Compounds," 1947, pp. 350–51, Reinhold Pub. Co., N.Y.

Kunin and Meyers: "Ion Exchange Resins" (1950), p. 38, 39, 128, published by John Wiley and Sons, N.Y.

Samuelson: "Ion Exchangers in Analytical Chem." (1953), pages 12, 261, John Wiley and Sons, N.Y.

Burstall et al.: "Ion Exchange Process for Recovery of Gold From Cyanide Sol'n.," Ind. and Eng. Chem., vol. 45, No. 8, 1953, pages 1652–1658.